(12) United States Patent
Fernandez Gulias et al.

(10) Patent No.: US 12,449,432 B2
(45) Date of Patent: Oct. 21, 2025

(54) ADD-ON AND REPETITION ALIQUOT TESTING WITH OR WITHOUT DILUTIONS

(71) Applicant: Roche Diagnostics Operations, Inc., Indianapolis, IN (US)

(72) Inventors: Carlos Fernandez Gulias, Barcelona (ES); Vanesa Leon Pujola, Barcelona (ES); Laura Pellitero Cornet, Barcelona (ES); Pau Roura Brun, Barcelona (ES); Werner Smit, Immensee (CH); Chye Yin Priscillia Tan, Ibach (CH); Gemma Urrutia Jou, Barcelona (ES); Moritz von Hopffgarten, Mannheim (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 626 days.

(21) Appl. No.: 17/894,858

(22) Filed: Aug. 24, 2022

(65) Prior Publication Data
US 2023/0116054 A1    Apr. 13, 2023

(30) Foreign Application Priority Data
Sep. 29, 2021   (EP) .................................... 21382873

(51) Int. Cl.
G01N 35/00    (2006.01)

(52) U.S. Cl.
CPC ... G01N 35/0092 (2013.01); G01N 35/00584 (2013.01); G01N 35/00732 (2013.01);
(Continued)

(58) Field of Classification Search
CPC ......... G01N 35/00584; G01N 35/0092; G01N 35/00732; G01N 2035/0094; G01N 2035/00851
See application file for complete search history.

(56) References Cited

U.S. PATENT DOCUMENTS

| 7,641,855 B2 | 1/2010 | Farina et al. |
| 7,647,190 B2 | 1/2010 | Uemura et al. |

(Continued)

FOREIGN PATENT DOCUMENTS

| EP | 2894479 A1 | 7/2015 |
| EP | 3096144 A1 | 11/2016 |

(Continued)

OTHER PUBLICATIONS

Office Action issued Sep. 8, 2023, in Japanese Application No. 2022-152110, English translation, 9 pp.
(Continued)

*Primary Examiner* — Paul M. West
(74) *Attorney, Agent, or Firm* — KATTEN MUCHIN ROSENMAN LLP

(57) ABSTRACT

A method of assigning an additional test to an existing aliquot sample tube or to a primary sample tube in a laboratory automation system is presented. The laboratory automation system comprises a workflow control unit and analytical laboratory devices in communication with the workflow control unit. The method comprises receiving an additional test request for the existing aliquot sample tube after processing of the existing aliquot sample tube has started, determining if the existing aliquot sample tube is at a retrievable target, waiting until the existing aliquot sample tube reaches a retrievable target if not at a retrievable target, determining if an aliquot timeout has occurred once the existing aliquot sample tube is at a retrievable target, reassigning the addition test to the primary sample tube if an aliquot timeout has occurred, and performing the additional test from the existing aliquot sample tube if no aliquot timeout has occurred.

21 Claims, 3 Drawing Sheets

(52) U.S. Cl.
CPC .............. *G01N 2035/00851* (2013.01); *G01N 2035/0094* (2013.01)

(56) References Cited

U.S. PATENT DOCUMENTS

| | | |
|---|---|---|
| 7,754,149 B2 | 7/2010 | Sugiyama |
| 9,804,065 B2 | 10/2017 | Suzuki et al. |
| 9,958,466 B2 | 5/2018 | Dalbert et al. |
| 2004/0175840 A1* | 9/2004 | Devlin, Sr. .......... G01N 35/025 436/518 |
| 2008/0050278 A1 | 2/2008 | Farina et al. |
| 2010/0066996 A1 | 3/2010 | Kosaka et al. |
| 2018/0340949 A1 | 11/2018 | Maetzler et al. |

FOREIGN PATENT DOCUMENTS

| | | |
|---|---|---|
| EP | 3435092 A1 | 1/2019 |
| JP | H06-034638 A | 2/1994 |
| JP | H08-278313 A | 10/1996 |
| JP | 2007-033132 A | 2/2007 |
| JP | 2010-501859 A | 1/2010 |
| JP | 2010-038659 A | 2/2010 |
| JP | 2014-048215 A | 3/2014 |
| WO | 2008/024758 A2 | 2/2008 |
| WO | 2017/163616 A1 | 9/2017 |

OTHER PUBLICATIONS

Notice of Allowance dated Sep. 17, 2024, from Japanese Patent Application No. 2022-152110, 3 sheets.
European Search Report issued Mar. 11, 2022, in Application No. 21382873.4, 2 pp.

\* cited by examiner

ADD-ON AND REPETITION ALIQUOT TESTING WITH OR WITHOUT DILUTIONS

CROSS-REFERENCE TO RELATED APPLICATIONS

This application claims priority to EP 21382873.4, filed Sep. 29, 2021, which is hereby incorporated by reference.

BACKGROUND

The present disclosure generally relates to a system and method for performing additional and repetition testing of pre-existing aliquots in a laboratory automation system.

There are several reasons to create aliquots in a laboratory automation system such as, for example, to reduce time, to prevent cross-contamination, to send a sample tube out from the laboratory automation system, to freeze samples, for regulatory reasons, customer preferences, to name just a few reasons. However, currently, it can be difficult to decide, after an additional/add-on test (repetition or reflex) is requested for an already created sample tube, whether the additional test should be performed on the original primary sample tube or from an already existing aliquot sample tube.

Currently, laboratory middleware solutions typically do not have the ability to control how the repetition of an addition of tests is performed through the workflow engine of the laboratory middleware. This can be a problem because sometimes the re-testing of samples needs to be done under different laboratory conditions and/or with different analytical laboratory devices and/or with or without dilutions.

In addition, a typical workflow engine of a typical laboratory middleware tends not to be flexible enough to adapt to requests for new additional tests on an aliquot sample tube after aliquoting has already occurred and the workflow has already started. Currently, this new test request can dictate that a new aliquot should be made from the primary tube or that there should be direct processing of the new test request from the primary tube instead of using the already existing aliquot. In other words, the additional test request is typically performed from the primary tube even though there may be a readily available aliquot in the laboratory automation system. In some cases, a new aliquot will be created even though there is already the readily available aliquot. This can result in laboratory economical and performance issues as well as additional associated costs for the laboratory automation system.

Another commonly occurring problem can happen where a test repetition request is not adequately handled (with or without dilution) resulting in inefficient performance in the laboratory automation system because the laboratory middleware workflow can make faulty decisions.

Therefore, there is a need to use pre-existing aliquot sample tubes that are readily available for additional tests requests for that sample in order to avoid wasting laboratory time and money through the use of primary sample tube or creation of additional new aliquot sample tubes.

SUMMARY

According to the present disclosure, a system and method of assigning an additional sample test to an existing aliquot sample tube of a sample or to a primary sample tube in a laboratory automation system is presented. The laboratory automation system can comprise a workflow control unit of a laboratory middleware, a plurality of laboratory devices in communication with the workflow control unit, and a transportation system. The method can comprise receiving by the workflow control unit an additional sample test request for the existing aliquot sample tube after processing of the existing aliquot sample tube has started, determining if the existing aliquot sample tube is at a retrievable target location, waiting until the existing aliquot sample tube reaches a retrievable target location via the transportation system if the existing aliquot sample tube is not at a retrievable target location, determining if an aliquot timeout has occurred once the existing aliquot sample tube is at a retrievable target location, reassigning the addition sample test to the primary sample tube by the workflow control unit if an aliquot timeout has occurred, transporting the existing aliquot sample tube to at least one of the analytical laboratory device by the transportation system if no aliquot timeout has occurred, and performing the additional sample test from the existing aliquot sample tube by the at least one of the analytical laboratory device.

Accordingly, it is a feature of the embodiments of the present disclosure to use pre-existing aliquot sample tubes that are already available for additional tests requests for that test sample to avoid having to use the primary sample tube or creating additional new aliquot sample tubes from the primary tube for a more efficient use of laboratory time and money. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
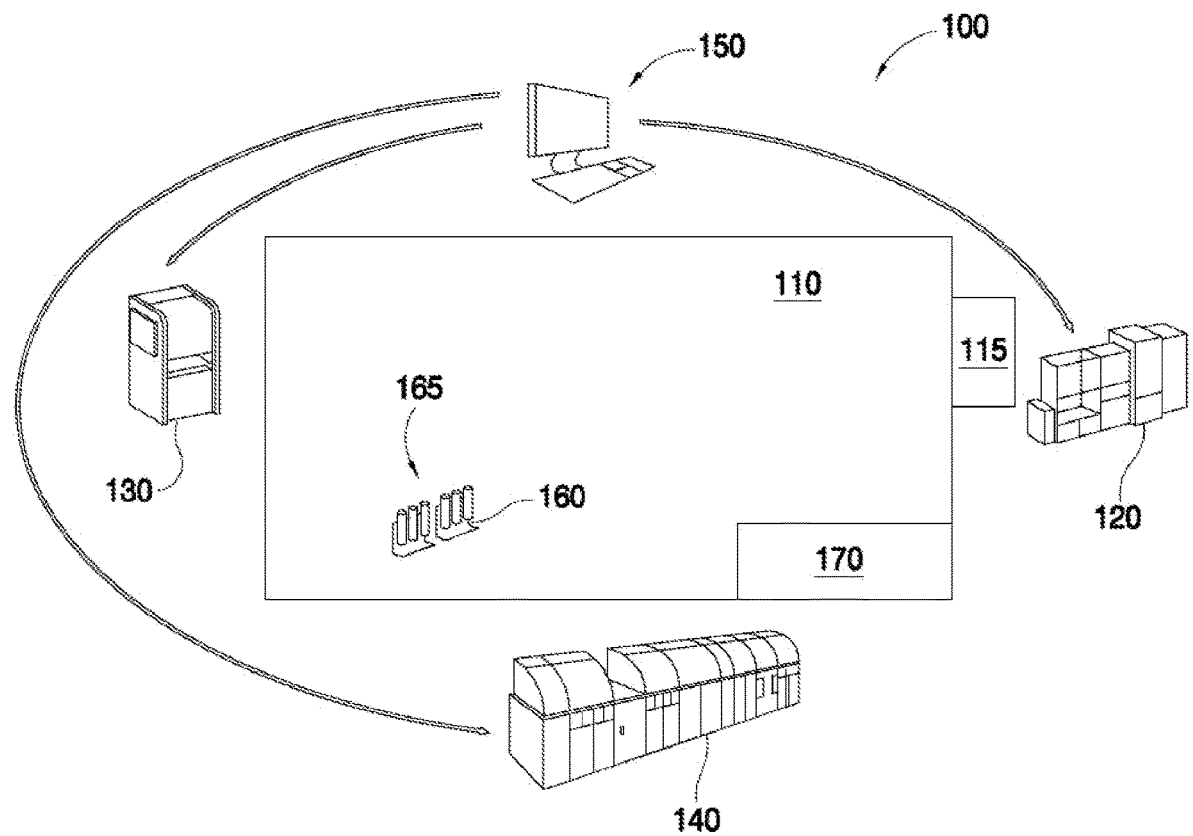
FIG. 1 illustrates a typical laboratory automation system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method of assigning an additional sample test to an existing aliquot sample tube of that sample or to the primary sample tube in a laboratory automation system is presented. The laboratory automation system can comprise a workflow control unit of a laboratory middleware, a plurality of analytical laboratory devices in communication with the workflow control unit, and a transportation system. The method can comprise receiving by the workflow control unit an additional sample test request for the existing aliquot sample tube after processing of the existing aliquot sample tube has started, determining if the existing aliquot sample tube is at a retrievable target location, waiting until the existing aliquot sample tube reaches a retrievable target location via the transportation system if the existing aliquot sample tube is not at a retrievable target location, determining if an aliquot timeout has occurred once the existing aliquot sample tube is at a retrievable target location, reassigning the addition sample test to the primary sample tube by the workflow control unit if an aliquot timeout has occurred, transporting the existing aliquot sample tube to at least one of the analytical laboratory device by the transportation system if no aliquot timeout has occurred, and performing the additional sample test from the existing aliquot sample tube by the at least one of the analytical laboratory device.

The method can further comprise determining if adequate sample volume is left in the existing aliquot sample tube for the additional sample test request once the existing aliquot sample tube is at a retrievable target location and no aliquot timeout has occurred, reassigning the requested additional sample test to the primary sample tube if not enough sample volume is left in the existing aliquot sample tube to perform the requested additional sample test, transporting the existing aliquot sample tube to at least one of the analytical laboratory device by the transportation system if adequate sample volume is left in the existing aliquot sample tube to perform the additional sample test, and performing the additional sample test from the existing aliquot sample tube at least one of the analytical laboratory device.

The method can further comprise discarding the existing aliquot sample tube if not enough sample volume is left in the existing aliquot sample tube to perform the additional sample test.

The method can further comprise discarding low priority test requests if not enough sample volume is left in the existing aliquot sample tube to perform the additional sample test.

The method can further comprise providing an error message back to the workflow control unit if there is not enough sample volume left in the existing aliquot sample tube to perform the additional sample test.

The method can further comprise determining the location of the primary sample tube if the additional sample test is reassigned to the primary sample tube and completing the reassignment of the additional sample test to the primary sample tube if the primary sample tube is at a retrievable target location.

The aliquot timeout can be time based and, after assigning the additional sample test to the existing aliquot sample tube, the aliquot timeout can be restarted by the workflow control unit.

The aliquot timeout can be message based and, after receiving a message regarding the existence of the existing aliquot sample tube, the aliquot timeout can be restarted by the workflow control unit.

If the additional sample test is reassigned to the primary sample tube, a new aliquot sample tube can be created and the aliquot timeout can be started by the workflow control unit.

The additional sample test can be a repetition test, a rerun test, and/or a reflex test.

A rerun test can be diluted manually or by an analytical laboratory device.

The additional sample test can be determined based on previous test results from that sample.

The method can further comprise assigning an analytical laboratory device to perform the additional sample test based on configuration of the laboratory automation system.

The method can further comprising notifying an operator of the laboratory automation system to which analytical laboratory device the additional sample test has been assigned.

A laboratory automation system can also be presented. The laboratory automation system can comprise a laboratory middleware comprising a workflow control unit. The workflow control unit can be configured to assign additional sample test requests to a primary sample tubes or to an existing aliquot sample tubes of that sample. The laboratory automation system can also comprise a plurality of analytical laboratory devices in communication with the workflow control unit and configured to perform tests of samples in the primary sample tubes and existing aliquot sample tubes and a transportation system configured to transport samples in the primary sample tubes and existing aliquot sample tubes to the plurality of analytical laboratory devices.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

The use of the 'a' or 'an' can be employed to describe elements and components of the embodiments herein. This is done merely for convenience and to give a general sense of the inventive concepts. This description should be read to include one or at least one and the singular includes the plural unless it is obvious that it is meant otherwise.

The term "sample" or "test sample" as used herein can be a broad term and can be given its ordinary and customary meaning to a person of ordinary skill in the art and may not be limited to a special or customized meaning. The term specifically may refer, without limitation, to an aliquot of a substance such as a chemical or biological compound. Specifically, the sample may be or may comprise at least one biological specimen, such as one or more of: blood; blood serum; blood plasma; urine; saliva. Additionally, or alternatively, the test sample may be or may comprise a chemical substance or compound and/or a reagent. The sample may specifically be a liquid sample, such as an aliquot of a fluid substance of the chemical or biological compound. For example, the liquid sample may be or may comprise at least one pure liquid, such as a liquid substance and/or a solution containing one or more liquid substances, comprising the at least one chemical and/or the biological substance. As another example, the liquid sample may be or may comprise a liquid mixture, such as a suspension, an emulsion and/or a dispersion of one or more chemical and/or biological substances. However, other, in particular non-liquid samples can be possible. For example, the container may be a reagent container. Other sample types may be, for example, tissue, homogenized material, calibration or monitoring container-like devices may be the handling subject.

The term "sample tube" as used herein can be a broad term and can be given its ordinary and customary meaning to a person of ordinary skill in the art and may not be limited to a special or customized meaning. The term specifically may refer, without limitation, to a receptacle, which can be configured for one or more of containing, storing and/or transporting a sample, specifically, a liquid sample. Further, the sample tube may be configured for being handled in a sample handling system. Specifically, the sample tube may be used in the field of medical and/or chemical laboratories. For example, the sample tube may be selected from the group comprising of: a vessel; a vial; a syringe; a cartridge; an ampoule; or a container. For example, the sample tube may comprise a sample tube body for containing the sample and a sample tube closure, such as a cap for sealing the sample tube. In the following, without restricting further possibilities, the option of a sample tube will be described, wherein the sample tube, as an example, may be positioned in a sample holder, with an open end pointing upwards.

The term 'sample tube carrier' as used herein can refer to any kind of holder configured to receive one or more sample tube and configured to be used for transporting sample tube(s). Sample tube carriers may be of two major types, single holders and sample racks.

A 'single holder' can be a type of sample tube carrier configured to receive and transport a single sample tube. Typically, a single holder can be provided as a puck, i.e., a flat cylindrical object with an opening to receive and retain a single sample tube.

A 'sample rack' can be a type of sample tube carrier, typically made of plastics and/or metal, adapted for receiving, holding and transporting a plurality of sample tubes, e.g., five or more sample tubes e.g., disposed in one or more rows. Apertures, windows or slits may be present to enable visual or optical inspection or reading of the sample tube or of the samples in the sample tube or of a label, such as a barcode, present on the sample tube held in the sample rack.

The term 'laboratory instrument' or "laboratory device" as used herein can encompass any apparatus or apparatus component operable to execute and/or cause the execution of one or more processing steps/workflow steps on one or more biological samples and/or one or more reagents. The expression 'processing steps' thereby can refer to physically executed processing steps such as centrifugation, aliquotation, sample analysis and the like. The term 'instrument' or 'device' can cover pre-analytical instruments/devices, post-analytical instruments/devices, analytical instruments/devices and laboratory middleware.

The term 'laboratory middleware' as used in the present description can refer to any physical or virtual processing device configurable to control a laboratory instrument/device or system comprising one or more laboratory instruments/devices in a way that workflow(s) and workflow step(s) can be conducted by the laboratory instrument/system. The laboratory middleware may, for example, instruct the laboratory instrument/system to conduct pre-analytical, post analytical and analytical workflow(s)/workflow step(s). The laboratory middleware may receive information from a data management unit regarding which steps need to be performed with a certain test sample. In some embodiments, the laboratory middleware can be integral with a data management unit, can be comprised by a server computer and/or be part of one laboratory instrument/device or even distributed across multiple instruments/devices of the laboratory automation system. The laboratory middleware may, for instance, be embodied as a programmable logic controller running a computer-readable program provided with instructions to perform operations.

The term "workflow control unit", as used herein can be a broad term and can be given its ordinary and customary meaning to a person of ordinary skill in the art and may not be limited to a special or customized meaning. The term specifically may refer, without limitation, to an electronic device configured, specifically, by hardware and/or by software programming, for controlling the functionality of the sample processing system within the laboratory middleware. The workflow control unit may further be configured for data exchange with the at least one monitoring system and/or at least one cloud server. Specifically, the workflow control unit may be or may comprise a computing device within the laboratory middleware, such as at least one processor, configured for receiving an electronic signal, such as the at least one item of information, from the at least one monitoring system and/or the at least one cloud server, and for further evaluating the received signal. Further, the workflow control unit may be configured for controlling the functionality based on the received and evaluated signal, for example, based on the at least one item of information.

A 'data storage unit' or 'database' can be a computing unit for storing and managing data such as a memory, hard disk or cloud storage. This may involve data relating to biological/medical test sample(s) to be processed by the automated system. The data management unit may be connected to an LIS (laboratory information system) and/or an HIS (hospital information system). The data management unit can be a unit within or co-located with a laboratory instrument/device. It may be part of the laboratory middleware. Alternatively, the database may be a unit remotely located. For instance, it may be embodied in a computer connected via a communication network.

The term 'communication network' as used herein can encompass any type of wireless network, such as a WiFi™, GSM™, UMTS or other wireless digital network or a cable based network, such as Ethernet™ or the like. In particular, the communication network can implement the Internet protocol (IP). For example, the communication network can comprise a combination of cable-based and wireless networks.

The term 'remote system' or 'server' as used herein can encompass any physical machine or virtual machine having a physical or virtual processor, capable of receiving; processing and sending data. A server can run on any computer including dedicated computers, which individually can also often be referred to as 'the server' or shared resources such as virtual servers. In many cases, a computer can provide several services and have several servers running. Therefore, the term server may encompass any computerized device that shares a resource with one or more client processes. Furthermore, the terms 'remote system' or 'server' can encompass a data transmission and processing system distributed over a data network (such as a cloud environment).

The term "transportation system" as used herein can be a broad term and can be given its ordinary and customary meaning to a person of ordinary skill in the art and may not be limited to a special or customized meaning. The term specifically may refer, without limitation, to an arbitrary system, which can be configured for moving and/or transporting and/or transferring and/or carrying objects from one position to another. Specifically, the transportation system may be configured for moving the plurality of sample tube carriers through the test sample transportation system such as from a laboratory loading device to another laboratory device of the test sample transportation system. The other laboratory device may be an analysis station. As an example, the transportation system may comprise at least one transport element selected from the group comprising of: a conveyor, such as a belt conveyor or a chain conveyor, or a vehicle system, such as an electronic vehicle system. The transportation system may be or may comprise a multilane transportation system having a plurality of transport elements. The transportation system may be or may comprise a plurality of parallel transport elements. The transport devices may be arranged in a common plane and/or in different planes such as on top of each other.

The term "moving" the plurality of sample tube carriers as used herein, can be a broad term and can be given its ordinary and customary meaning to a person of ordinary skill in the art and may not be limited to a special or customized meaning. The term specifically may refer, without limitation, to an action of transporting and/or transferring and/or carrying the sample tube carriers by using the transportation system. Specifically, the transportation system may be configured for moving the sample tube carriers individually. For example, each of the sample tube carriers may be moved in at least one individual direction, specifically, independently from each other. For example, the movement of the sample tube carriers may be a one-dimensional movement in one direction along the transportation system. As another example, the movement of the sample tube carriers may be a two-dimensional movement in two directions along the transportation system. Additionally, or alternatively, the sample tube carriers may be moved in a third direction by the transportation system by passing a difference in height of the sample handling system. Further, the transportation system may be configured for moving the plurality of sample tube carriers in a bi-directional manner.

Referring initially to FIG. 1, FIG. 1 illustrates a typical laboratory automation system setup 100. In a typical laboratory automation system 100, a plurality of different laboratory devices such as, for example, pre-analytical laboratory devices 130, analytical laboratory devices 115, 140, and post-analytical laboratory devices 120 can be connected together via a transportation system 110. A pre-analytical laboratory device 130 can usually be used for the preliminary processing of samples 165 into the primary sample tubes and aliquot sample tubes. An analytical laboratory device 140 can be designed, for example, to use a sample from the primary sample tube or an aliquot sample tube or part of the sample and a test reagent in order to produce a measurable signal, based on which it is possible to determine whether an analyte is present, and if desired in what concentration. A post-analytical laboratory device 120 can be used for the post-processing of samples or sample tubes like the archiving of samples or sample tube carriers.

The transportation system 110 can be used to transport sample tube carriers 160 comprising test samples in primary sample tubes and/or aliquot sample tubes between the plurality of different laboratory devices 120, 130, 140. Control of the movement of the sample tube carriers 160 between the plurality of laboratory devices 120, 130, 140 can be managed by a workflow control unit of a laboratory middleware 150. The laboratory workflow control unit 150 can communicate with the plurality of laboratory devices 120, 130, 140 as well as, the transportation system 110 to manage the flow of the sample tubes through the laboratory automation system 100.

According to the present disclosure, a laboratory operator via the laboratory middleware 150 may need to request additional tests for a test sample located in a post-analytical laboratory device 120 such as, for example, an archive such as, for example, a refrigerator. The test sample may reside in a primary sample tube or in an aliquot sample tube or both. According to workflow constraints of the laboratory middleware 150, the additional tests may be assigned to only the primary sample tube, to only the aliquot sample tube, or to both the primary and aliquot sample tubes.

Figure 2:
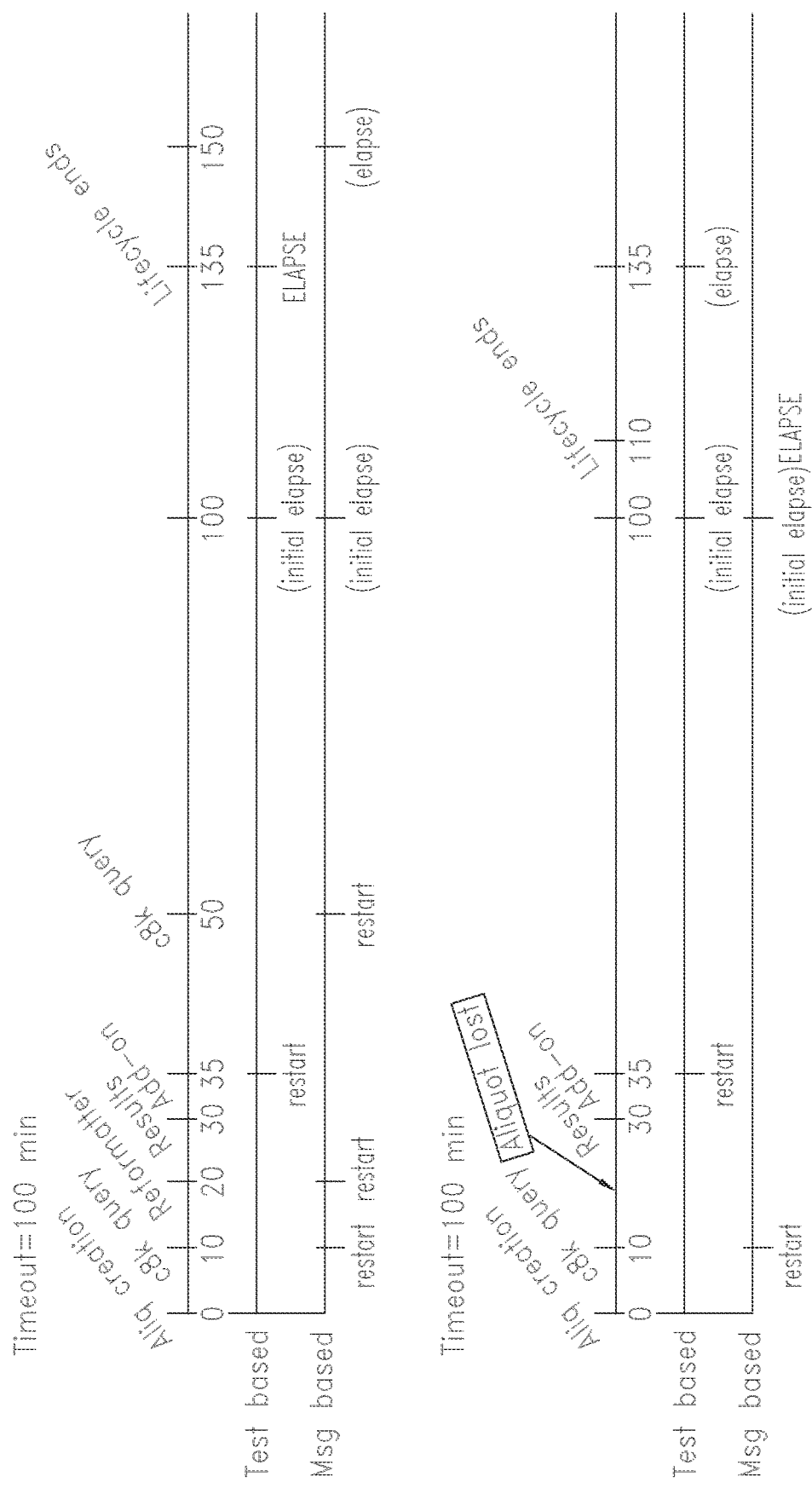
FIG. 2A illustrates the end of an aliquot lifecycle due to elapsed time since the test request was received according to an embodiment of the present disclosure.
FIG. 2B illustrates the end of the aliquot lifecycle due to missing incoming messages that the aliquot still exists according to an embodiment of the present disclosure.

In assigning the additional tests, the laboratory automation system can check two different timeout scenarios as illustrated in FIGS. 2A-B. In FIG. 2A, the end of an aliquot lifecycle due to the time that has elapsed since the test request was received is illustrated. In FIG. 2B, the end of the aliquot lifecycle due to missing incoming messages that the aliquot still exists is illustrated. If either of the timeouts is exceeded during the processing of the samples, the additional tests will be assigned to primary sample tube by default.

Referring to FIG. 2A, when an aliquot sample tube is originally created, an aliquot timeout can be started. In the example of FIG. 2A, the timeout is illustrated as being 100 minutes but any reasonable aliquot timeout may be feasible. When an additional test request is received by the laboratory middleware 150 and assigned to the already existing aliquot sample tube, the aliquot timeout can be restarted, thereby extending the lifecycle time of the aliquot sample tube. In the embodiment where the aliquot sample tube is not created by the laboratory automation system, i.e., a foreign aliquot, the aliquot timeout can also be restarted when the foreign aliquot sample tube enters the laboratory automation system. When timeout is exceeded by the aliquot sample tube, e.g., greater than 100 minutes have elapsed in the embodiment illustrated; the aliquot sample tube can be discarded by the laboratory automation system.

In FIG. 2B, when an aliquot sample tube is originally created, an aliquot-message timeout can also be started. In the message-based timeout scenario, the aliquot-message timeout can be restarted every time a message (e.g., c8k query in this embodiment) is received by the laboratory middleware 150 from the aliquot sample tube indicating that the aliquot sample tube still exists in the laboratory automation system. If the aliquot sample tube subsequently becomes lost by the laboratory automation system, the aliquot-message timeout is never restarted.

Figure 3:
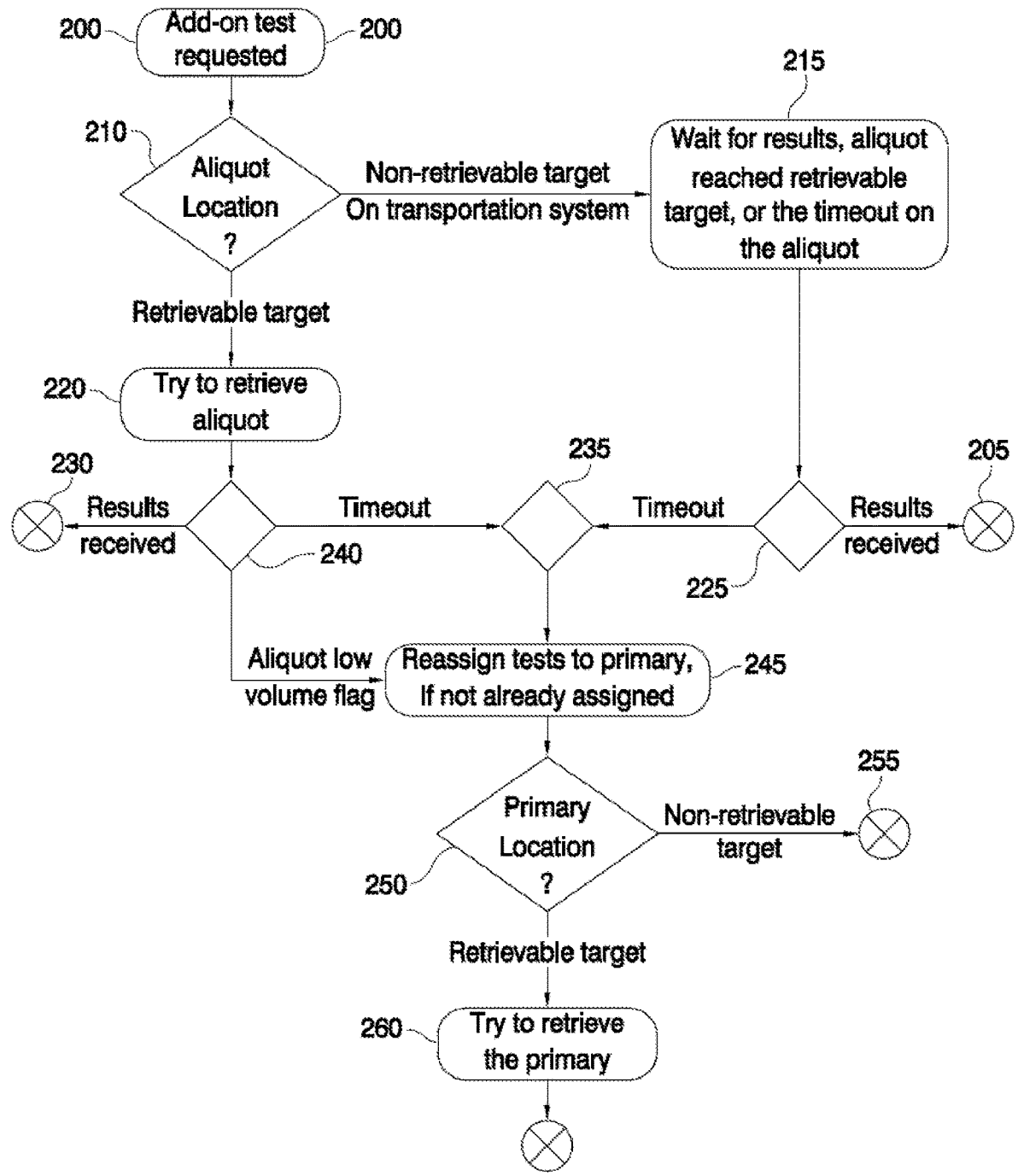
FIG. 3 illustrates a flowchart of a method of assigning additional tests to a test sample according to an embodiment of the present disclosure.

FIG. 3 illustrates a flowchart of a method of assigning additional tests to a test sample. In one embodiment, if a request for an additional test for a sample is received by the laboratory middleware from a Hospital Information System (HIS) or Laboratory Information System (LIS), the workflow control unit of the laboratory middleware will calculate and execute the workflow for that additional test. If an aliquot test is requested, typically an aliquot sample tube will be created from the primary sample tube.

However, in step 200, if the request for an additional, or add-on, test for a sample for which an aliquot sample tube already exists is received by the laboratory middleware, the workflow control unit of the laboratory middleware will determine if the existing aliquot sample tube can be used.

In step 210, the location of the existing aliquot sample tube is determined. If the existing aliquot sample tube can be located at a retrievable target location, i.e., the existing aliquot sample tube is located at a place where the existing aliquot sample tube can be retrieved and routed to an analytical laboratory device automatically by the laboratory automation system, the existing aliquot sample tube in step 220 will be retrieved from that retrievable target location to an analytical laboratory device to perform the requested additional test. Examples of retrievable target locations can be a temporary buffer location on the transportation system or an archival device such as, for example, a refrigerator.

In step 240, the laboratory middleware will determine if the retrieved aliquot sample tube has exceeded a timeout (either a time or a message timeout) or still has adequate remaining sample volume in the existing aliquot sample tube to perform the requested additional test. If the existing aliquot sample tube has not exceeded a timeout and still has adequate remaining sample volume, the existing aliquot sample tube will be routed to a suitable analytical laboratory device for the requested additional testing. The results of these requested additional testing performed by the suitable analytical laboratory device will then be sent to the laboratory middleware in step 230.

In one embodiment where the laboratory automation system does not track sample volume of the aliquot sample tube, if the laboratory operator attempts to perform additional tests on an existing aliquot sample tube that does not have enough sample volume left, the existing aliquot sample tube will elapse immediately. In this embodiment, the laboratory middleware 150 will receive a sample volume error from the analytical laboratory device 140 that attempted to perform the additional test on the existing aliquot sample tube with inadequate sample volume. The laboratory middleware 150 will then assign the requested additional test to the primary sample tube. If the primary sample tube requires an aliquot, an aliquot sample tube will be created at this time.

In another embodiment, where the sample volume in the existing aliquot sample tubes is constantly being monitored by the analytical laboratory devices 140 and/or modules of the transportation system 110, if there is insufficient sample volume in the existing aliquot sample tube for the planned additional tests, the insufficient sample volume can be detected before the routing of the existing aliquot sample tube to the analytical laboratory device(s) 140 by the laboratory middleware. An error message will be provided from the existing aliquot sample tube to the workflow control unit of the laboratory middleware if there is not enough sample volume left in the existing aliquot sample tube to perform the additional sample test. In such a case, the laboratory middleware can provide one of the following solutions:

- Reduce the number of additional tests assigned to the existing aliquot sample tube and use the primary sample tube for any remaining tests.
- Reduce the number of additional tests assigned to the existing aliquot sample tube and create another aliquot sample tube for any remaining tests.
- Discard the existing aliquot sample tube and use the primary sample tube for all remaining open tests.
- Discard any low priority tests assigned to the existing aliquot sample tube.

Monitoring the sample volume in the aliquot sample tubes can allow for more flexibility and better turn-around-time (TAT) for the laboratory automation system since insufficient sample volume can be detected before the analytical laboratory device tries to remove sample from the existing aliquot sample tube. Thus, the steps of retrieving the primary sample tube, reassigning the additional tests and creating a new aliquot sample tube can be accomplished sooner.

Returning to FIG. 3, if, however, there is insufficient sample volume remaining in the existing aliquot sample tube or a time or message timeout has been exceeded (step 235), the existing aliquot sample tube will be discarded and the requested additional test will be reassigned to the primary sample tube in step 245.

If the existing aliquot sample tube, in step 210, is found to be at a non-retrievable target location on the transportation system, i.e., for example, already located at an analytical laboratory device, the laboratory automation system will wait, in step 215, until the existing aliquot sample tube is finished at the non-retrievable target location.

In step 225, it can be determined that the results from the analytical laboratory device have been received (step 205) by the laboratory middleware. Additionally, if, in step 225, it was determined that a timeout for the existing aliquot sample tube had been exceeded, the method will proceed to step 235. Finally, if the existing aliquot sample tube reaches a retrievable target location, the method can proceed to step 220.

In step 250, the location of the primary sample tube will be determined by the laboratory middleware. If the primary sample tube is found to be located at a non-retrievable target location on the transportation system (e.g., at an analytical laboratory device), the laboratory automation system will wait until the primary sample tube test results from the analytical laboratory device are received by the laboratory middleware and the primary sample tube reaches a retrievable target location. At that point, the method will proceed to step 260. If, however, the primary sample tube fails to reach a retrievable target location or a timeout is exceeded, the additional test request will fail in step 255.

If the primary sample tube is in a retrievable target location, the primary sample tube, in step 260, will be retrieved and routed to the appropriate analytical laboratory device to perform the requested additional test.

The above method can help the laboratory automation system support repetition sample testing with or without dilutions of the sample, rerun sample testing with both manual and instrument dilution of the sample, and reflex sample testing, i.e., where different sample testing is performed based on previous sample testing results. In addition, the laboratory middleware will decide which analytical laboratory device 140 will perform the repetition sample testing and will inform the laboratory operator to which analytical laboratory device the sample testing was assigned.

Thus, the laboratory automation system provides a method for the laboratory operator to select the analytical laboratory device 140 that can or cannot perform the repetition sample testing. The laboratory workflow control unit can execute the repetition sample testing on the specific aliquot and/or primary sample tube(s) on certain specific analytical laboratory device(s) based on the configuration of the analytical laboratory device(s) and/or the laboratory automation system.

Further disclosed and proposed is a computer program product including computer-executable instructions for performing the disclosed method in one or more of the embodiments enclosed herein when the program is executed on a computer or computer network. Specifically, the computer program may be stored on a computer-readable data carrier or a server computer. Thus, specifically, one, more than one or even all of method steps as indicated above may be performed by using a computer or a computer network, preferably by using a computer program.

As used herein, a computer program product refers to the program as a tradable product. The product may generally exist in any format, such as in a paper format, or on a computer-readable data carrier on premise or located at a remote location. Specifically, the computer program product may be distributed over a data network (such as a cloud environment). Furthermore, not only the computer program product, but also the execution hardware may be located on premise or in a cloud environment.

Further disclosed and proposed is a computer-readable medium comprising instructions which, when executed by a computer system, cause a laboratory automation system to perform the method according to one or more of the embodiments disclosed herein.

Further disclosed and proposed is a modulated data signal comprising instructions, which, when executed by a computer system, cause a laboratory automation system to perform the method according to one or more of the embodiments disclosed herein.

Referring to the computer-implemented aspects of the disclosed method, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method of assigning an additional sample test to an existing aliquot sample tube of a sample or to a primary sample tube in a laboratory automation system, wherein the laboratory automation system comprises a workflow control unit of a laboratory middleware, a plurality of laboratory devices in communication with the workflow control unit, and a transportation system, the method comprising:
   receiving by the workflow control unit an additional sample test request for the existing aliquot sample tube after processing of the existing aliquot sample tube has started;
   determining if the existing aliquot sample tube is at a retrievable target location;
   waiting until the existing aliquot sample tube reaches a retrievable target location via the transportation system if the existing aliquot sample tube is not at a retrievable target location;
   determining if an aliquot timeout has occurred once the existing aliquot sample tube is at a retrievable target location;
   reassigning the addition sample test to the primary sample tube by the workflow control unit if an aliquot timeout has occurred;
   transporting the existing aliquot sample tube to at least one of the analytical laboratory device by the transportation system if no aliquot timeout has occurred; and
   performing the additional sample test from the existing aliquot sample tube by the at least one of the analytical laboratory device;
   wherein the aliquot timeout is time based or message based,
   wherein, if the aliquot timeout is time based, after assigning the additional sample test to the existing aliquot sample tube, the aliquot timeout is restarted by the workflow control unit, and
   wherein, if the aliquot message is messaged based, after receiving a message, the aliquot timeout is restarted by the workflow control unit.

2. The method according to claim 1, further comprising, determining the location of the primary sample tube if the additional sample test is reassigned to the primary sample tube; and
   completing the reassignment of the additional sample test to the primary sample tube if the primary sample tube is at a retrievable target location.

3. The method according to claim 1, wherein the additional sample test is a repetition test, a rerun test, and/or a reflex test.

4. The method according to claim 3, wherein a rerun test is diluted manually or by an analytical laboratory device.

5. The method according to claim 1, wherein the additional sample test is determined based on previous test results from that sample.

6. The method according to claim 1, further comprising, assigning the at least one analytical laboratory device to perform the additional sample test based on configuration of the laboratory automation system.

7. The method of claim 6, further comprising:
   notifying an operator of the laboratory automation system to which analytical laboratory device the additional sample test has been assigned.

8. A method of assigning an additional sample test to an existing aliquot sample tube of a sample or to a primary sample tube in a laboratory automation system, wherein the laboratory automation system comprises a workflow control unit of a laboratory middleware, a plurality of laboratory devices in communication with the workflow control unit, and a transportation system, the method comprising:
   receiving by the workflow control unit an additional sample test request for the existing aliquot sample tube after processing of the existing aliquot sample tube has started;
   determining if the existing aliquot sample tube is at a retrievable target location;
   waiting until the existing aliquot sample tube reaches a retrievable target location via the transportation system if the existing aliquot sample tube is not at a retrievable target location;
   determining if an aliquot timeout has occurred once the existing aliquot sample tube is at a retrievable target location;
   reassigning the addition sample test to the primary sample tube by the workflow control unit if an aliquot timeout has occurred;
   transporting the existing aliquot sample tube to at least one of the analytical laboratory device by the transportation system if no aliquot timeout has occurred;

performing the additional sample test from the existing aliquot sample tube by the at least one of the analytical laboratory device;

determining if adequate sample volume is left in the existing aliquot sample tube for the additional sample test once the existing aliquot sample tube is at a retrievable target location and no aliquot timeout has occurred;

reassigning the additional sample test to the primary sample tube if not enough sample volume is left in the existing aliquot sample tube to perform the additional sample test;

transporting the existing aliquot sample tube to at least one of the analytical laboratory device by the transportation system if adequate sample volume is left in the existing aliquot sample tube to perform the additional sample test; and performing the additional sample test from the existing aliquot sample tube at least one of the analytical laboratory device.

9. The method according to claim 8, further comprising, discarding the existing aliquot sample tube if not enough sample volume is left in the existing aliquot sample tube to perform the additional sample test.

10. The method according to claim 8, further comprising, discarding low priority tests if not enough sample volume is left in the existing aliquot sample tube to perform the additional sample test.

11. The method according to claim 8, further comprising, providing an error message to the workflow control unit of the laboratory middleware if there is not enough sample volume left in the existing aliquot sample tube to perform the additional sample test.

12. The method according to claim 8, wherein the aliquot timeout is time based and wherein, after assigning the additional sample test to the existing aliquot sample tube, the aliquot timeout is restarted by the workflow control unit.

13. The method according to claim 8, wherein the aliquot timeout is message based and wherein, after receiving a message, the aliquot timeout is restarted by the workflow control unit.

14. The method according to claim 8, wherein if the additional sample test is reassigned to the primary sample tube, a new aliquot sample tube is created and the aliquot timeout is started by the workflow control unit.

15. The method according to claim 8, further comprising, determining the location of the primary sample tube if the additional sample test is reassigned to the primary sample tube; and completing the reassignment of the additional sample test to the primary sample tube if the primary sample tube is at a retrievable target location.

16. The method according to claim 8, wherein the additional sample test is a repetition test, a rerun test, and/or a reflex test.

17. The method according to claim 16, wherein a rerun test is diluted manually or by an analytical laboratory device.

18. The method according to claim 8, wherein the additional sample test is determined based on previous test results from that sample.

19. The method according to claim 8, further comprising, assigning the at least one analytical laboratory device to perform the additional sample test based on configuration of the laboratory automation system.

20. The method of claim 19, further comprising:
notifying an operator of the laboratory automation system to which analytical laboratory device the additional sample test has been assigned.

21. A method of assigning an additional sample test to an existing aliquot sample tube of a sample or to a primary sample tube in a laboratory automation system, wherein the laboratory automation system comprises a workflow control unit of a laboratory middleware, a plurality of laboratory devices in communication with the workflow control unit, and a transportation system, the method comprising:

receiving by the workflow control unit an additional sample test request for the existing aliquot sample tube after processing of the existing aliquot sample tube has started;

determining if the existing aliquot sample tube is at a retrievable target location;

waiting until the existing aliquot sample tube reaches a retrievable target location via the transportation system if the existing aliquot sample tube is not at a retrievable target location;

determining if an aliquot timeout has occurred once the existing aliquot sample tube is at a retrievable target location;

reassigning the addition sample test to the primary sample tube by the workflow control unit if an aliquot timeout has occurred;

transporting the existing aliquot sample tube to at least one of the analytical laboratory device by the transportation system if no aliquot timeout has occurred; and performing the additional sample test from the existing aliquot sample tube by the at least one of the analytical laboratory device, wherein, if the additional sample test is reassigned to the primary sample tube, a new aliquot sample tube is created and the aliquot timeout is started by the workflow control unit.

* * * * *